No. 625,977. Patented May 30, 1899.
P. HUDDLE.
DEVICE FOR CUTTING AWAY SWARD FROM SIDEWALKS.
(Application filed Aug. 27, 1898.)
(No Model.)
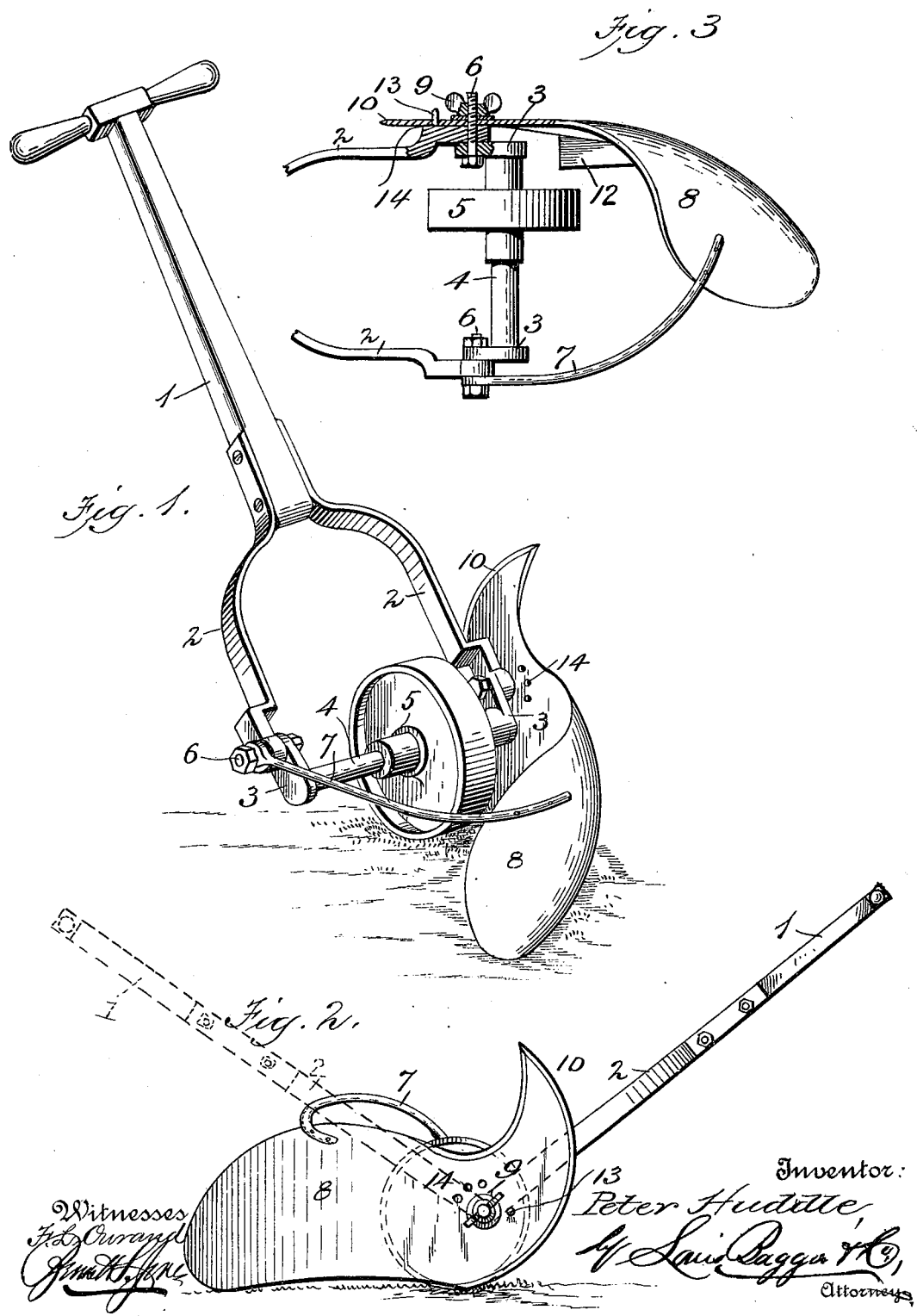

UNITED STATES PATENT OFFICE.

PETER HUDDLE, OF TIFFIN, OHIO, ASSIGNOR OF TWO-THIRDS TO ELVIN K. HUDDLE AND EARLE T. HUDDLE, OF SAME PLACE.

DEVICE FOR CUTTING AWAY SWARD FROM SIDEWALKS.

SPECIFICATION forming part of Letters Patent No. 625,977, dated May 30, 1899.

Application filed August 27, 1898. Serial No. 689,626. (No model.)

*To all whom it may concern:*

Be it known that I, PETER HUDDLE, a citizen of the United States, residing at Tiffin, in the county of Seneca and State of Ohio, have invented new and useful Improvements in Devices for Cutting Away Sward from Sidewalks, of which the following is a specification.

My invention relates to apparatus or machines for cutting sod along the edges of sidewalks or curbstones; and its object is to provide an improved construction of the same whereby the cutter which cuts the sod and the moldboard formed integral therewith for turning or throwing the cut sod out of the way can be reversed, so as to allow the machine to be pushed or pulled in operation, as found most convenient or desirable.

The invention consists in the novel construction and combination of parts hereinafter fully described and claimed.

In the accompanying drawings, Figure 1 is a perspective view of a sod-cutting machine constructed in accordance with my invention. Fig. 2 is a side elevation of the same. Fig. 3 is a plan view, partly in section.

In the said drawings the reference-numeral 1 designates a handle provided at its lower end with two curved arms 2. These arms have secured to them lugs 3, with which is connected a shaft or axle 4, upon which is journaled a wheel 5. Passing through these lugs and arms are pins or studs 6, to one of which is secured a rearwardly-extending curved rod or bar 7.

The numeral 8 designates a curved rearwardly and inwardly extending moldboard, the rear end of which is secured to said rod or bar 7. The front end of this board is provided with a hole or aperture through which passes one of the pins or studs 6. This pin is screw-threaded and is provided with a thumb-nut 9. The front end of said moldboard is turned upwardly and sharpened, forming a curved cutting edge 10. It is also formed with a flange 12, sharpened to form a cutting edge. One of the arms 2 is provided with a small pin 13, which is adapted to engage with apertures or holes 14, formed in the moldboard. The upwardly-extending portion of the moldboard is concaved and formed with a cutting edge $10^a$ opposite the cutting edge 10, which may also be used as a trimmer by turning the device upside down.

When the machine is used as a puller, the parts will occupy the position shown in Fig. 1, and it is pulled along the edge of a sidewalk or curbstone, the cutting edges cutting the sod, which will be turned up and thrown to one side by the moldboard.

To use the device as a pusher, the thumb-nut is unloosened and the handle reversed, as shown by the dotted lines, Fig. 3. The pin 13 will now engage with one of the other holes or apertures 14.

Having thus fully described my invention, what I claim is—

1. In a sod-cutting machine, the combination with the handle, the curved arms secured thereto, the shaft or axle and the wheel, of the curved moldboard formed with a cutting edge and a sharpened flange, substantially as described.

2. In a sod-cutting machine, the combination with the handle, the curved arms secured thereto, the lugs at the lower ends thereof, the shaft or axle, the wheel thereon and the pins passing through said lugs and arms, of the curved moldboard having a cutting edge and an inwardly-extending sharpened flange, the curved bar secured to said moldboard and one of said pins, and the pin passing through the moldboard and provided with a thumb-nut, substantially as described.

3. In a sod-cutting machine, the combination with the handle, the curved arms secured thereto, the lugs secured to said arms, the pins passing therethrough, the shaft or axle and the wheel, of the reversible curved moldboard formed with a cutting edge and a sharpened flange, and with a series of holes, the bar secured to said moldboard, the small pin engaging therewith and the thumb-nut engaging with the pin or stud passing through the moldboard, substantially as described.

In testimony whereof I have hereunto set my hand in presence of two subscribing witnesses.

PETER HUDDLE.

Witnesses:
JOHN H. RIDGELY,
ANNA M. REIF.